(12) United States Patent  
Trudel et al.

(10) Patent No.: US 7,786,848 B2  
(45) Date of Patent: Aug. 31, 2010

(54) VEHICLE SECURITY SYSTEMS

(75) Inventors: Sylvain Trudel, Rock Forest (CA); Jean-Paul Raymond, St-Jean-sur-Richelieu (CA); Charles Petit, Ste-Catherine de Hatley (CA); Yves Pratte, Rock Forest (CA)

(73) Assignee: Directed Electronics Inc., Vista, CA (US)

( * ) Notice: Subject to any disclaimer, the term of this patent is extended or adjusted under 35 U.S.C. 154(b) by 57 days.

(21) Appl. No.: 11/437,727

(22) Filed: May 22, 2006

(65) Prior Publication Data

US 2006/0267743 A1 Nov. 30, 2006

Related U.S. Application Data

(60) Provisional application No. 60/682,871, filed on May 20, 2005.

(51) Int. Cl.  
*B60R 25/10* (2006.01)

(52) U.S. Cl. ............... 340/426.1; 340/426.13; 340/426.15; 340/426.16; 340/539.1

(58) Field of Classification Search ... 340/425.5–426.1, 340/426.15–426.18  
See application file for complete search history.

(56) References Cited

U.S. PATENT DOCUMENTS

| | | | | |
|---|---|---|---|---|
| 3,703,714 A * | 11/1972 | Andrews | ............... | 180/289 |
| 3,893,069 A * | 7/1975 | Mason | ............... | 340/428 |
| 3,906,472 A * | 9/1975 | Guadara et al. | ............... | 455/99 |
| 4,189,720 A * | 2/1980 | Lott | ............... | 340/539.26 |
| 4,417,235 A * | 11/1983 | Del Grande | ............... | 340/531 |
| 4,612,535 A * | 9/1986 | Sequin et al. | ............... | 340/539.26 |
| 4,689,603 A * | 8/1987 | Conigliaro et al. | ............... | 307/10.4 |
| 4,706,073 A * | 11/1987 | Vila Masot | ............... | 340/639 |
| 4,897,630 A * | 1/1990 | Nykerk | ............... | 340/426.25 |
| 4,905,271 A | 2/1990 | Namekawa | | |
| 4,924,206 A * | 5/1990 | Ayers | ............... | 340/426.13 |
| 5,357,560 A | 10/1994 | Nykerk | | |
| 5,612,668 A * | 3/1997 | Scott | ............... | 340/426.13 |
| 5,739,747 A * | 4/1998 | Flick | ............... | 340/426.15 |
| 5,739,748 A * | 4/1998 | Flick | ............... | 340/426.15 |
| 5,870,020 A | 2/1999 | Harrison, Jr. | | |
| 5,973,592 A | 10/1999 | Flick | | |
| 6,002,326 A * | 12/1999 | Turner | ............... | 340/426.1 |
| 6,009,320 A | 12/1999 | Dudley | | |
| 6,028,506 A * | 2/2000 | Xiao | ............... | 340/426.21 |
| 6,049,269 A * | 4/2000 | Byrd et al. | ............... | 340/426.21 |
| 6,172,599 B1 | 1/2001 | Bothen | | |
| 6,246,315 B1 * | 6/2001 | Thomas et al. | ............... | 340/426.14 |
| 6,249,221 B1 * | 6/2001 | Reed | ............... | 340/539.14 |

(Continued)

*Primary Examiner*—Daniel Wu  
*Assistant Examiner*—Son M Tang  
(74) *Attorney, Agent, or Firm*—Ogilvy Renault LLP

(57) ABSTRACT

A complementary security system for installation, at least in part in a vehicle, has an Original Equipment Manufacturer (OEM) security system installed therein. The complementary security system for communicating an alarm condition beyond the communication range of the OEM security system. The complementary security system comprising: a control module for receiving a trigger signal being indicative of the alarm condition detected by the OEM security system; a communication module for transmitting by Radio Frequency (RF) an alert signal upon receipt of the trigger signal by the control module; and a remote transmitter for alerting a user upon receipt of the alert signal. The remote transmitter being located beyond the communication range of the OEM security system. A corresponding method is also described.

13 Claims, 4 Drawing Sheets

U.S. PATENT DOCUMENTS

| | | | |
|---|---|---|---|
| 6,265,966 B1 * | 7/2001 | Ireland et al. | 340/426.14 |
| 6,353,383 B1 * | 3/2002 | Gross et al. | 340/425.5 |
| 6,429,768 B1 * | 8/2002 | Flick | 340/5.2 |
| 6,445,291 B2 | 9/2002 | Addy et al. | |
| 6,489,886 B2 * | 12/2002 | Meier | 340/426.1 |
| 6,542,072 B1 | 4/2003 | Yang | |
| 6,556,135 B2 | 4/2003 | Attring et al. | |
| 6,563,421 B1 * | 5/2003 | Wheeler | 340/539.14 |
| 6,844,829 B2 | 1/2005 | Mayor | |
| 2002/0145522 A1 * | 10/2002 | Pembroke | 340/573.1 |
| 2005/0099275 A1 | 5/2005 | Kamdar et al. | |
| 2005/0134448 A1 | 6/2005 | Perlman et al. | |

* cited by examiner

US 7,786,848 B2

VEHICLE SECURITY SYSTEMS

CROSS-REFERENCE TO RELATED APPLICATIONS

This application claims priority under 35USC§119(e) from U.S. provisional patent application 60/682,871 filed on May 20, 2005 and incorporated herein by reference.

TECHNICAL FIELD

This present invention relates to the field of vehicle security systems.

BACKGROUND

Furthermore, there is a growing tendency for manufacturers in the automobile industry to integrate Original Equipment Manufacturer (OEM) security systems in vehicles. These systems can be interfaced directly with door sensors, interlocks, shock sensors and other devices meant to provide barrier breach detection. Although a triggered alarm may alert the immediate surroundings of the infraction, anyone beyond a few hundred feet will most likely remain oblivious to the alert. Generally speaking, these devices, once triggered, will manifest an alarm condition by flashing the vehicle headlights and dome light and sounding the horn in a specific pattern.

SUMMARY

According to an aspect of the invention there is provided a complementary security system for installation, at least in part, in a vehicle having an Original Equipment Manufacturer (OEM) security system for communicating an alarm condition beyond the communication range of the OEM security system. The complementary security system comprising: a control module for receiving a trigger signal being indicative of the alarm condition detected by the OEM security system; a communication module for transmitting by Radio Frequency (RF) an alert signal upon receipt of the trigger signal by the control module; and a remote transmitter for alerting a user upon receipt of the alert signal. The remote transmitter being located beyond the communication range of the OEM security system.

According to an aspect of the invention there is provided a method for communicating an alarm condition beyond the communication range of an OEM security system. The OEM security system being installed in a vehicle. The method comprising: receiving a trigger signal being indicative of the alarm condition detected by the OEM security system; transmitting by RF an alert signal upon receipt of the trigger signal; receiving the alert signal beyond the communication range of the OEM security system; and alerting a user upon receipt of the alert signal.

DETAILED DESCRIPTION

Figure 1:
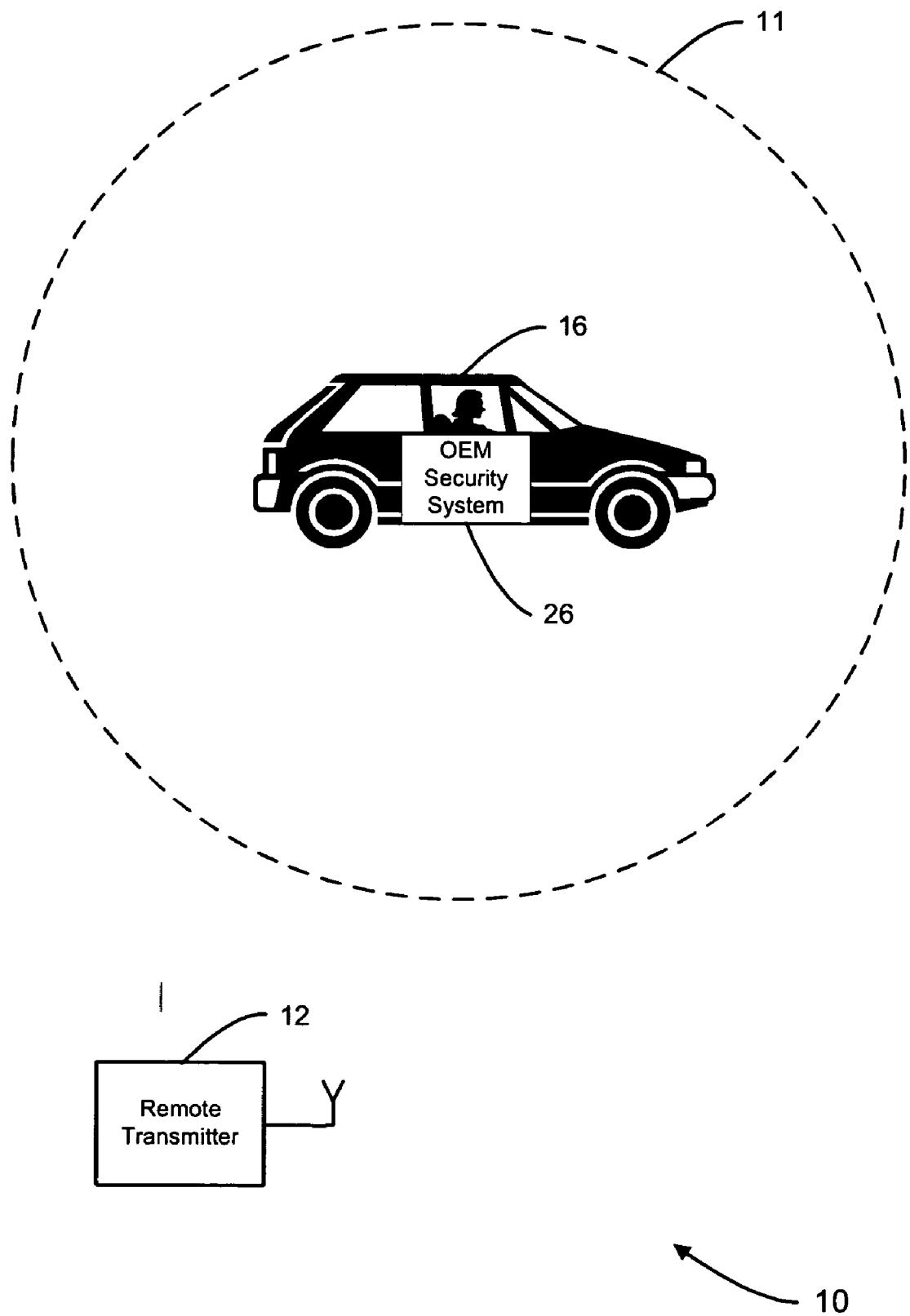
FIG. 1 is a schematic diagram showing a top view of the environment in which the complementary security system according to an embodiment of the present invention operates.
Figure 2:
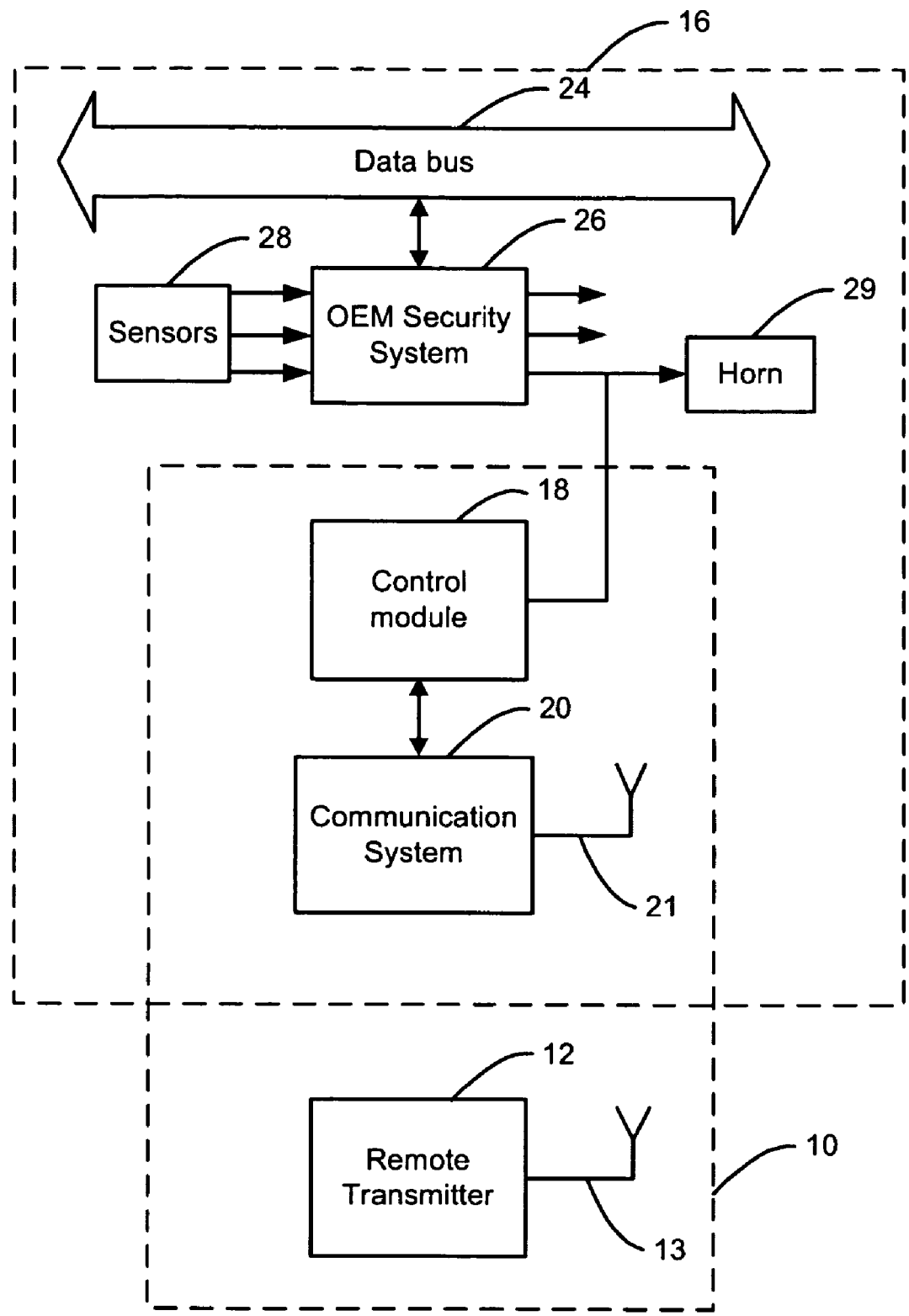
FIG. 2 is a block diagram showing an overall view of the vehicle security system according to an embodiment of the invention.

As shown in FIG. 1, a complementary security system 10 comprises a remote transmitter 12 (also referred to herein as a remote control device or key fob) and other components installed in vehicle 16 which are not shown in FIG. 1, but which are shown in more detail in FIG. 2. The vehicle security system 10 is capable of communicating an alarm condition beyond the communication range 11 of the OEM security system 26 installed vehicle 16. It is understood that, in the present context, the communication range of the OEM security system is normally approximately 100 meters or less.

FIG. 2 shows the complementary security system 10 in more detail. The complementary security system 10 comprises a remote transmitter 12, a control module 18 and a communication module 20.

A vehicle 16 equipped with complementary security system 10 has the capability of communicating an alert directly to the carrier/user (not shown) of a remote control device 12 beyond the intended range of the OEM security system 26 whether or not it has the capability of communicating an alert to the user.

The complementary security system 10 is meant to enhance the performance of the OEM security system 26 either in terms of range, if an OEM key fob (not shown) exists, or by adding an RF communication capability to the OEM security system 26. Either way, the complementary security system 10 capabilities will provide a wireless link to a key fob carrier/user for the purpose of communicating vehicle security status changes; e.g., an alarm condition.

The control module 18 and the communication module 20 are meant to be integrated into vehicle 16 and connected in such a way as to determine that the OEM security system 26 has detected an infraction. Most security systems will, upon detection of an infraction, activate vehicle features either audible or visual. The presently described complementary security system 10 is for detecting such activations and communicating this status change to the remote transmitter 12 (i.e., a key fob) by RF.

Communication module 20 is connected to antenna 21 for enabling RF communication to remote transmitter 12 through antenna 13. Antenna 21 can also be said to form part of communication module 20. Communication module 20 may also comprises a power supply, an oscillator, a modulator, an amplifier.

The communication module 20 may also include an encoding module for encoding the alert signal, an encryption module for encrypting the alert signal, and/or an addressing module for assigning a given remote transmitter address to the alert signal.

Remote transmitter 12 may include vibrating means for producing a vibration, light means for emitting light, and/or sound means for emitting sound. The means for emitting light may comprise a liquid crystal display (LCD) and/or a light emitting diode (LED). The vibrating means may comprise an electric motor connected to an unbalanced weight. The sound means may comprise a speaker and/or a piezoelectric transducer.

Sensors 28 are meant to detect security infractions. Sensors 28 are shown to be connected to OEM security system 26 for communicating thereto the infraction detection. Alternatively, sensors 28 may be connected to data bus 24 to which the OEM security system 26 is connected. Infraction detection can hence be transmitted to OEM security system 26 through data bus 24.

Signals exiting the OEM security system 26 (e.g., going to horn 29) are used for determining the presence of trigger signals. Hence a specific horn signal pattern is an example of the presence of a trigger signal.

The detection of an infraction can therefore be accomplished by, for example, the sensing and detection of specific horn patterns, dome light flashing sequences, head lamp flashing sequences, parking light flashing sequences, or siren signal as indicative of an alarm condition having been detected by the OEM security system 26.

Figure 3:
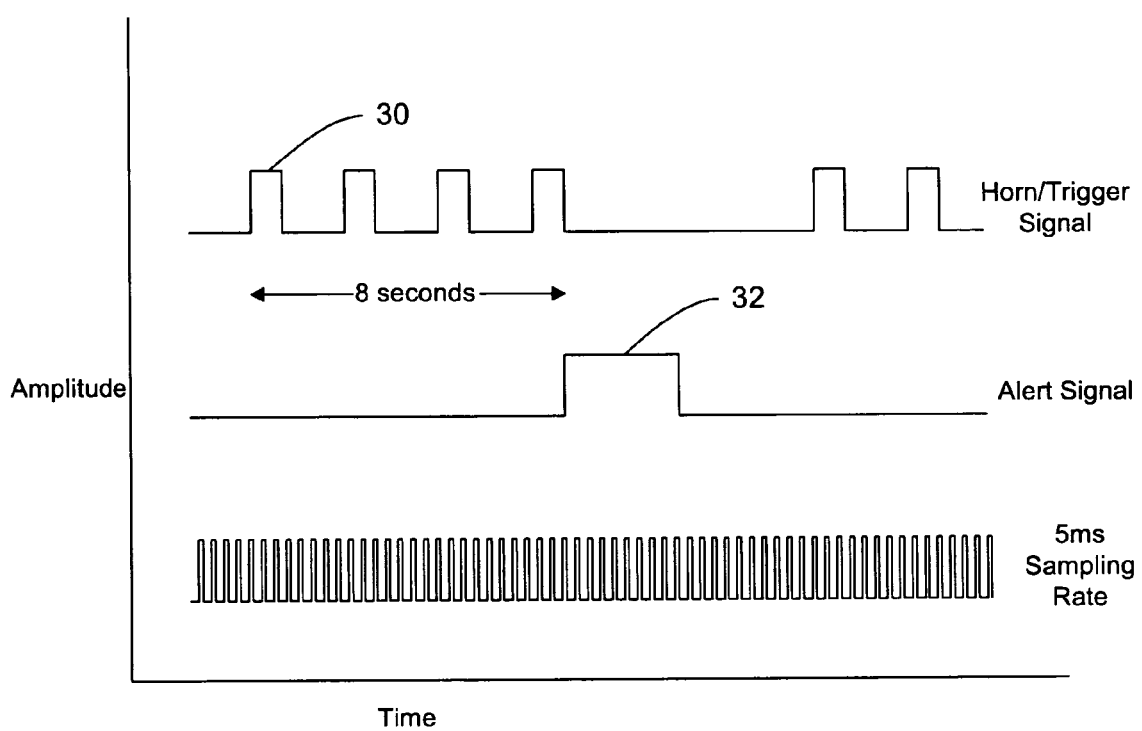
FIG. 3 is a chart showing an alarm trigger scheme using a vehicle horn using according to an embodiment of the invention.

Now turning to FIG. 3, there is shown a chart showing an alarm trigger scheme using a vehicle horn according to an embodiment of the invention. A typical trigger sequence, when sensing the vehicle horn, requires that four (4) horn activations occur within an eight (8) second period. A valid horn activation must have a duration 30 of at least 55 milliseconds while two activations must be separated by a quiet period of the same duration. An alarm condition is deemed terminated when a 2.75 second quiet period is detected at the horn's electrical input. It is understood that certain OEM systems use a siren that is activated by a constant voltage input in which case a simple detection of this drive voltage is sufficient to indicate a triggered alarm. Monitoring other features will require an appropriate trigger detection method. Once an alarm trigger scheme is determine to be present an alert signal 32 is produced by the control module 18 and forwarded by communication module 20.

Figure 4:
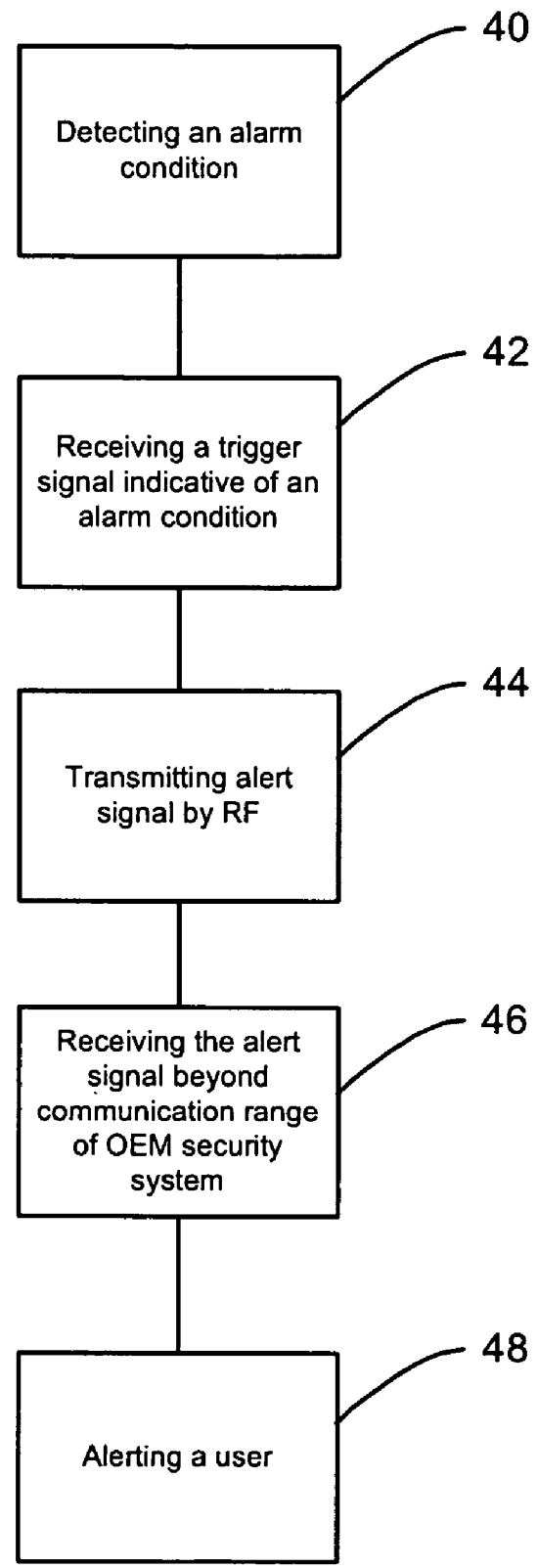
FIG. 4 is flow chart illustrating a method for communicating an alarm condition beyond the communication range of an OEM security system.

FIG. 4 illustrates a method for communicating an alarm condition beyond the communication range 11 of an OEM security system 26. The method comprises said OEM security system detecting an alarm condition (step 40); receiving a trigger signal being indicative of the alarm condition detected by the OEM security system (step 42); transmitting by RF an alert signal upon receipt of the trigger signal (step 44); receiving the alert signal beyond the communication range of the OEM security system (step 46); and alerting a user upon receipt of the alert signal (step 48).

While illustrated in the block diagrams as groups of discrete components communicating with each other via distinct data signal connections, it will be understood by those skilled in the art that the embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the present embodiments.

The invention claimed is:

1. A complementary security system for installation, at least in part, in a vehicle, said complementary security system comprising:
 a control module for receiving a trigger signal indicative of an alarm condition detected by an security system, the trigger signal having a given trigger sequence for the vehicle, the trigger sequence having a predetermined minimum duration to be indicative of the alarm condition, said security system being already installed in said vehicle and having a remote Radio Frequency (RF) communication system having a first communication range for communicating a first alarm signal to a user via a first remote control device;
 a communication module connected to the control module and adapted for transmitting by Radio Frequency (RF) a second alarm signal upon receipt of said trigger signal by said control module, said second alarm signal having a second communication range greater than the first communication range and having a frequency level corresponding to that used for remote control devices; and
 a second remote control device for alerting the user upon receipt of said second signal, said second remote control device being located beyond the given communication range of the remote communication system of the security system.

2. The complementary security system of claim 1, wherein the trigger signal is selected from the group consisting of a horn pattern signal, a parking light flashing sequence signal, a dome light flashing sequence signal, a head lamp flashing sequence signal, and a siren signal.

3. The complementary security system of claim 1, wherein said remote control device comprises at least one of vibrating means for producing a vibration, light means for emitting light, and sound means for emitting sound.

4. The complementary security system of claim 3, wherein said means for emitting light comprises at least one of a liquid crystal display (LCD) and a light emitting diode (LED), wherein said vibrating means comprises an electric motor connected to an unbalanced weight, and wherein said sound means comprises at least one of a speaker and a piezoelectric transducer.

5. The complementary security system of claim 1, wherein said communication module comprises at least one of an encoding module for encoding said second alarm signal, an encryption module for encrypting said second alarm signal, and an addressing module for assigning a given remote control device address to said second alarm signal.

6. The complementary security system of claim 1, wherein said communication module comprises at least one of a power supply, an oscillator, a modulator, an amplifier, and an antenna.

7. The complementary security system of claim 6, wherein said communication module comprises at least one of an encoding module for encoding said second alarm signal, an encryption module for encrypting said second alarm signal, and an addressing module for assigning a given remote control device address to said second alarm signal.

8. A method for communicating an alarm condition, said method comprising:
 receiving a trigger signal indicative of an alarm condition detected by an original security system, the trigger signal having a given trigger sequence for the vehicle, the trigger sequence having a predetermined minimum duration to be indicative of the alarm condition, said original security system being already installed in a vehicle and having a remote Radio Frequency (RF) communication system having a first communication range for communicating a first alarm signal to a user via a first remote control device;
 transmitting by Radio Frequency (RF) a second alarm signal upon receipt of said trigger signal, said second alarm signal having a second communication range greater than the first communication range and having a frequency level corresponding to that used for remote control devices;
 receiving said second alarm signal beyond the given communication range of the remote Radio Frequency (RF) communication system of the original security system at a second remote control device; and
 alerting the user upon receipt of said second alarm signal.

9. The method of claim 8, wherein the trigger signal is selected from the group consisting of a horn pattern signal, a parking light flashing sequence signal, a dome light flashing sequence signal, a head lamp flashing sequence signal, and a siren signal.

10. The method of claim 8, wherein said alerting comprises at least one of vibrating, emitting light, and emitting sound.

11. The method of claim 8, wherein said transmitting comprises at least one of encoding said second alarm signal, for encrypting said second alarm signal, and assigning a given remote control device address to said second alarm signal.

12. The method of claim 8, further comprising detecting said alarm condition.

13. The method of claim 12, wherein said detecting is performed by said original security system.

\* \* \* \* \*